US009813373B2

(12) United States Patent
Zhang et al.

(10) Patent No.: US 9,813,373 B2
(45) Date of Patent: Nov. 7, 2017

(54) METHODS AND DEVICES FOR ONLINE CONTACTS EXPANSION

(71) Applicant: Tencent Technology (Shenzhen) Company Limited, Shenzhen, Guangdong (CN)

(72) Inventors: Xiaolong Zhang, Guangdong (CN); Lejun Liu, Guangdong (CN); Yuewei Chen, Guangdong (CN); Yongyu Lin, Guangdong (CN); Yingxia Lin, Guangdong (CN); Changpeng Pan, Guangdong (CN); Wen Zha, Guangdong (CN); Yonglong Wei, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 344 days.

(21) Appl. No.: 14/603,129

(22) Filed: Jan. 22, 2015

(65) Prior Publication Data
US 2015/0215261 A1     Jul. 30, 2015

Related U.S. Application Data

(63) Continuation of application No. PCT/CN2014/082310, filed on Jul. 16, 2014.

(30) Foreign Application Priority Data

Sep. 30, 2013   (CN) .......................... 2013 1 0466039

(51) Int. Cl.
*H04L 12/58*     (2006.01)
*H04L 29/08*     (2006.01)
*G06Q 10/10*     (2012.01)

(52) U.S. Cl.
CPC ............. *H04L 51/32* (2013.01); *G06Q 10/10* (2013.01); *H04L 51/16* (2013.01); *H04L 67/306* (2013.01)

(58) Field of Classification Search
CPC ........ H04L 51/32; H04L 51/16; H04L 67/306
(Continued)

(56) References Cited

U.S. PATENT DOCUMENTS 8,660,602 B2 *   2/2014   Akhtar .................... H04L 51/28
                                                            455/412.1
2006/0136561 A1 *   6/2006   Lee ...................... H04L 29/1215
                                                                   709/206
(Continued)

FOREIGN PATENT DOCUMENTS

| CN | 101901252 A | 12/2010 |
|---|---|---|
| CN | 102710636 A | 10/2012 |
| CN | 102970326 A | 3/2013 |

OTHER PUBLICATIONS

"IsatPhone Pro: How to Synchronize Your Contacts"—Inmarsat, May 2010 https://www.inmarsat.com/wp-content/uploads/2014/04/IsatPhone_Pro_How_to_synchronise_contacts_EN.pdf.*

(Continued)

*Primary Examiner* — Randy Scott
(74) *Attorney, Agent, or Firm* — Brinks Gilson & Lione

(57) ABSTRACT

A device may include a storage medium and a processor. The processor may execute a set of instructions in the storage medium to: provide a first platform; provide a first user account registered in the first platform to a user; access, through the first user account, a second user account of the user registered in a second platform; obtain, from the second user account, a communication log of the second user account; obtain an address list from the second user account; obtain a plurality of contacts from the second user account who have a prior communication with the user through the second user account based on the communication log; select,
(Continued)

from the plurality of contacts, at least one recommended contact for the user; combine the at least one recommended contact with the address list in to a combined list; and display the combined list via the first user account, highlighting the at least one recommended contact to the user.

16 Claims, 7 Drawing Sheets

(58) Field of Classification Search
USPC ........ 709/206, 207, 231, 232; 707/689, 748, 707/769; 705/14.1, 14.16
See application file for complete search history.

(56) References Cited

U.S. PATENT DOCUMENTS

| | | | |
|---|---|---|---|
| 2009/0177691 A1* | 7/2009 | Manfredi | G06F 17/3089 |
| 2011/0078190 A1* | 3/2011 | Samuel | G06Q 10/06 |
| | | | 707/780 |
| 2012/0271957 A1* | 10/2012 | Carney | H04L 51/36 |
| | | | 709/228 |
| 2013/0085816 A1 | 4/2013 | Wilmore et al. | |
| 2013/0102290 A1* | 4/2013 | Akhtar | H04L 51/28 |
| | | | 455/414.1 |

OTHER PUBLICATIONS

International Search Report dated Oct. 22, 2014 in International Application No. PCT/CN2014/082310.
Written Opinion dated Oct. 22, 2014 in International Application No. PCT/CN2014/082310.

* cited by examiner

US 9,813,373 B2

METHODS AND DEVICES FOR ONLINE CONTACTS EXPANSION

PRIORITY STATEMENT

This application is a continuation of International Application No. PCT/CN2014/082310, filed on Jul. 16, 2014, in the State Intellectual Property Office of the People's Republic of China, which claims the priority benefit of Chinese Patent Application No. 201310466039.8 filed on Sep. 30, 2013, the disclosures of which are incorporated herein in their entirety by reference.

TECHNICAL FIELD

The present disclosure relates to technologies in internet field. Specifically, the present disclosure relates to methods and devices for online contacts expansion.

BACKGROUND

With development of internet technologies, applications of online social network widely use information saved in an online account (e.g., an E-mail account or an instant messenger account) as a source to obtain interpersonal connection data of the account holder. Firstly, user may register an account in a communication platform, such as an E-mail box provider (e.g., Google for Gmail and Yahoo! for Yahoo! email) or an instant message provider (e.g., Google for Google Hangouts, and Tencent for WeChat), in which the account may include a contacts list. Then, the user can communicate with the contacts in contacts list through a communication application (e.g., Google Hangouts and WeChat) supported by the communication platform.

The contacts in the contacts list are usually added manually by the user, process of which may be: the user first becomes aware of an account number of a contact and inputs the account number into the communication application (hereinafter "the application"); the application sends to the communication platform (hereinafter "the platform") an addition request message, which carries along with an account number of the user's account and the account number of the contact; the platform then add the account number of the contact into the contacts list contained in the user's account in accordance with the addition request.

It is necessary for a user to get aware of the account number of the contact before add the contact into contacts list; but generally the amount of account number that the user can obtain is usually restricted. Therefore, it is difficult for the user to expand the contacts quickly and effectively merely by adding account he/she is aware of without helping from other tools.

SUMMARY

According to an aspect of the present disclosure, a computer-implemented method for expanding online contacts of an account user may include providing a first account registered in a first communication platform to a user, wherein the first communication platform includes a processor. Additionally, the method may include, by the processor, accessing through the first account a second account of the user registered in a second communication platform; obtaining from the second account a communication log associated with communication history of the user through the second account; obtaining an address list from the second account, wherein the address list includes a plurality of personal connections of the user; obtaining a plurality of contacts from the second account who have a prior communication with the user through the second account based on the communication log; selecting from the plurality of contacts at least one recommended contact for the user; combining the at least one recommended contact with the address list in to a combined list; and displaying the combined list via the first account, highlighting the at least one recommended contact to the user.

According to another aspect of the present disclosure, a device may include a processor-readable non-transitory storage medium and a processor in communication with the storage medium. The processor may execute a set of instructions included in the storage medium to: provide a first communication platform; provide a first account registered in the first communication platform to a user; access, through the first account, a second account of the user registered in a second communication platform; obtain, from the second account, a communication log associated with communication history of the user through the second account; obtain an address list from the second account, wherein the address list includes a plurality of personal connections of the user; obtain a plurality of contacts from the second account who have a prior communication with the user through the second account based on the communication log; select, from the plurality of contacts, at least one recommended contact for the user; combine the at least one recommended contact with the address list in to a combined list; and display the combined list via the first account, highlighting the at least one recommended contact to the user.

DETAILED DESCRIPTION

In order to further describe the present disclosure in detail, preferred embodiments will be described and the objects, technical scheme and advantages of the present disclosure will be more evident.

Figure 4:
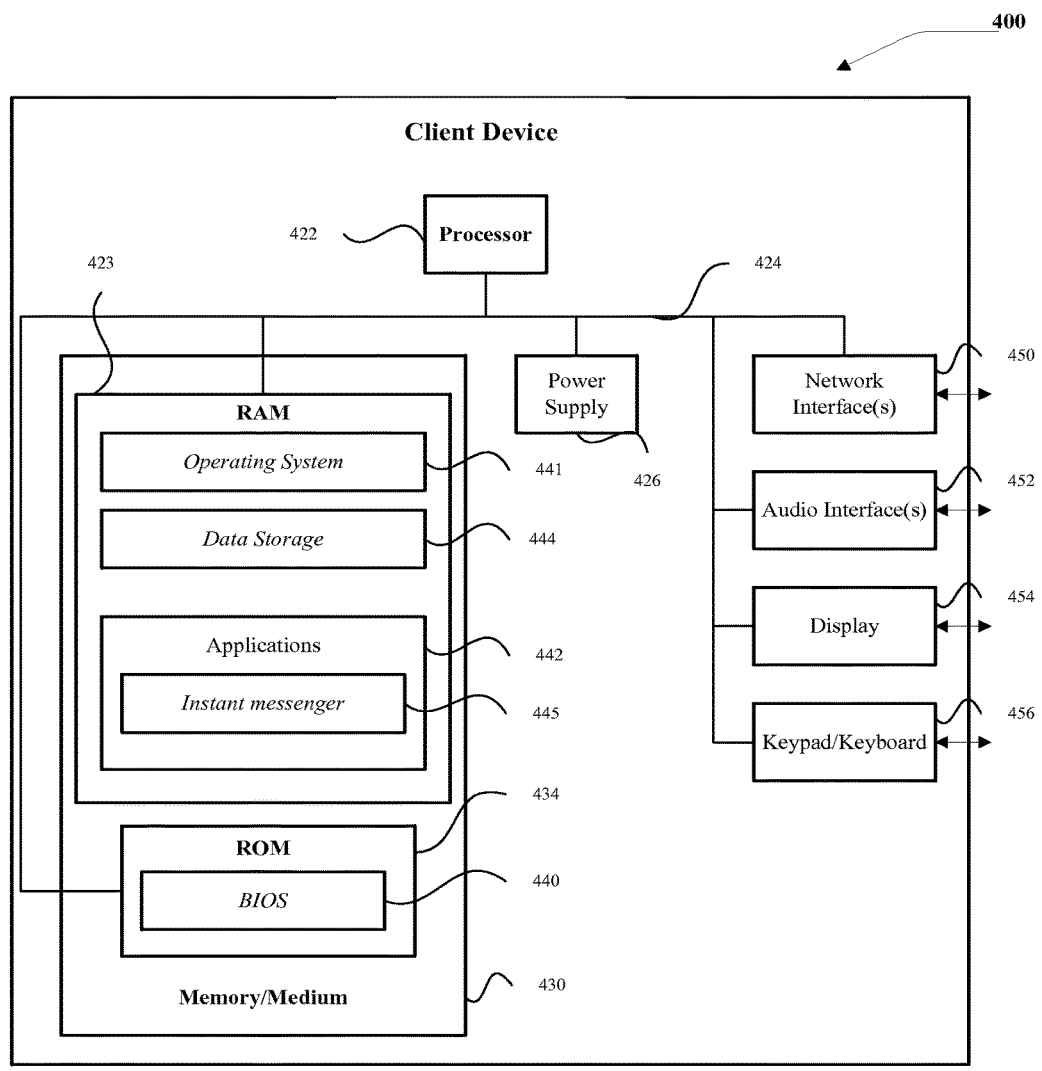
FIG. 4 is a schematic diagram illustrating an example embodiment of a client device.

FIG. 4 is a schematic diagram illustrating an example embodiment of a client device that may be used by individual user of a communication platform as introduced in the present disclosure. The client device may include apparatuses to execute methods and software systems introduced in the present disclosure. A client device 400 may be a computing device capable of executing a software system. The client device 400 may, for example, be a device such as a personal desktop computer or a portable device, such as a laptop computer, a tablet computer, a cellular telephone, or a smart phone.

The client device 400 may vary in terms of capabilities or features. Claimed subject matter is intended to cover a wide range of potential variations. For example, the client device 400 may include a keypad/keyboard 456. It may also include a display 454, such as a liquid crystal display (LCD), or a display with a high degree of functionality, such as a touch-sensitive color 2D or 3D display. In contrast, however, as another example, a web-enabled client device 400 may include one or more physical or virtual keyboards, and mass storage medium 430.

The client device 400 may also include or execute a variety of operating systems 441, including an operating system, such as a Windows™ or Linux™, or a mobile operating system, such as iOS™ Android™, or Windows Mobile™. The client device 400 may include or may execute a variety of possible applications 442, such as an instant messenger 445 (e.g., Google Hangouts and/or WeChat). An application 442 may enable communication with other devices via a network, such as communicating with another client device used by another person or a server via a network.

Further, the client device 400 may include one or more non-transitory processor-readable storage media 430 and one or more processors 422 in communication with the non-transitory processor-readable storage media 430. For example, the non-transitory processor-readable storage media 430 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 430 may store sets of instructions, or units and/or modules that may include the sets of instructions, for conducting operations and/or method steps described in the present disclosure. Alternatively, the units and/or modules may be hardware disposed in the client device 400 configured to conduct operations and/or method steps described in the present disclosure. The one or more processors may be configured to execute the sets of instructions and perform the operations in example embodiments of the present disclosure.

Figure 5:
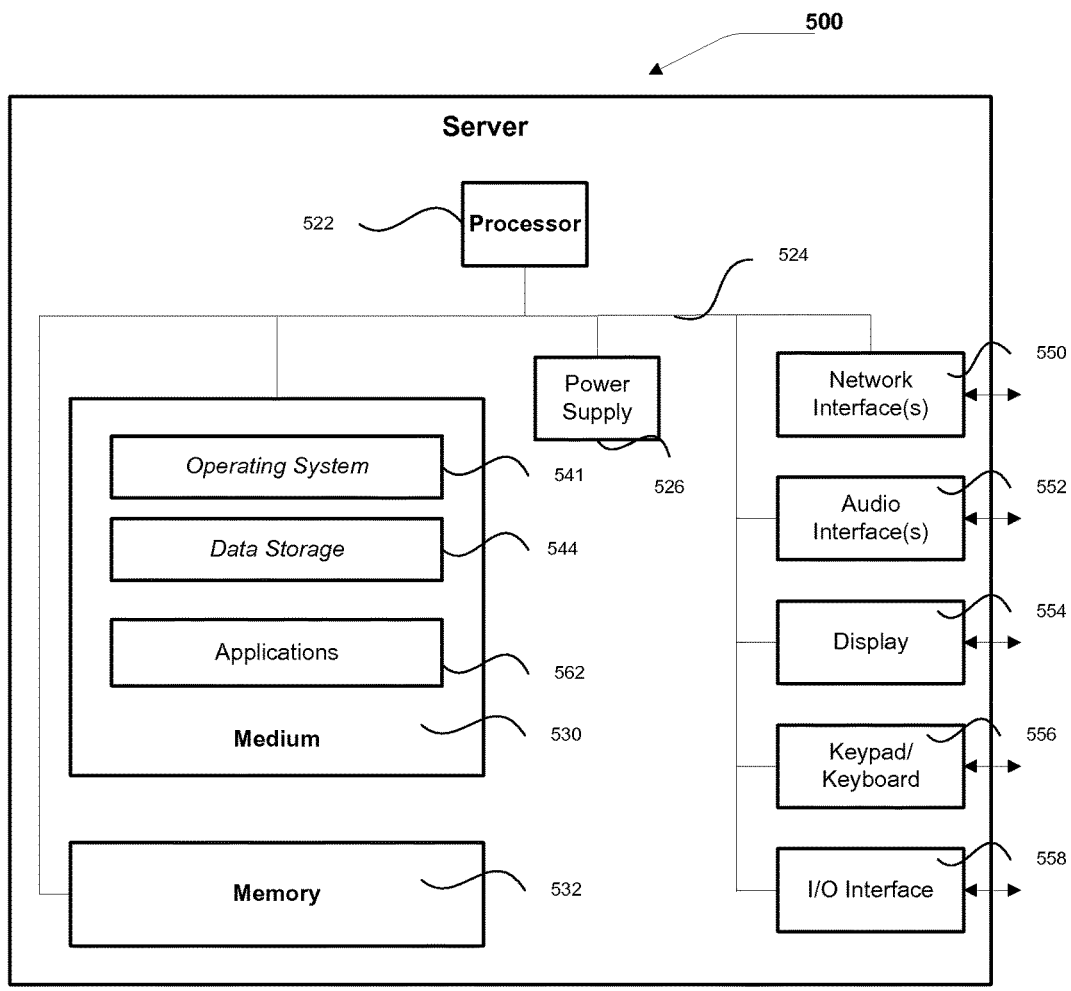
FIG. 5 is a schematic diagram illustrating an example embodiment of a server.

FIG. 5 is a schematic diagram illustrating an example embodiment of a server. The server 500 may provide support for the communication platform as described in the present disclosure and may connect to the client device 400 locally or via a network. A Server 500 may vary widely in configuration or capabilities, but it may include at least one central processing unit, e.g., processor 522, and memory 532, at least one medium 530 (such as one or more mass storage devices) storing application programs 542 or data 544 for the communication platform, one or more power supplies 526, one or more wired or wireless network interfaces 550, one or more input/output interfaces 558, and/or one or more operating systems 541, such as Windows Server™, Mac OS X™ Unix™, Linux™, FreeBSD™, or the like. Thus a server 500 may include, as examples, dedicated rack-mounted servers, desktop computers, laptop computers, set top boxes, mobile computational devices such as smart phones, integrated devices combining various features, such as two or more features of the foregoing devices, or the like.

The server 500 may serve as a search server or a content server. A content server may include a device that may include a configuration to provide content via a network to another device. A content server may, for example, host a site, such as a social networking site, examples of which may include, but are not limited to, Flicker™, Twitter™, Facebook™, LinkedIn™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that may include, but are not limited to, web services, third party services, audio services, video services, E-mail services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server may include desktop computers, multiprocessor systems, microprocessor type or programmable consumer electronics, etc.

Merely for illustration, only one processor will be described in client devices and servers that execute operations and/or method steps in the following example embodiments. However, it should be note that the client devices in the present disclosure may also may include multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

According to, methods for contact expansion introduced in example embodiments of the present disclosure may require communications between two platforms. Each platform is operated by a server 500 and is in communication with at least one user. The user may have an account in the corresponding platform and log in the account via an application installed in a client device 400. Through the user account, the user may be able to send instructions to the platform through the application. For example, the application may be an instant messenger (e.g., Google Hangouts or WeChat) or an application to open an E-mail box (e.g., an internet browser or outlook). Upon receiving the instruction, the corresponding server 500 of the platform may execute instructions of programs installed therein to perform steps in the methods in the present disclosure. For example, the server 500 of a first platform may communicate with a server of a second platform to conduct certain operations.

Figure 1:
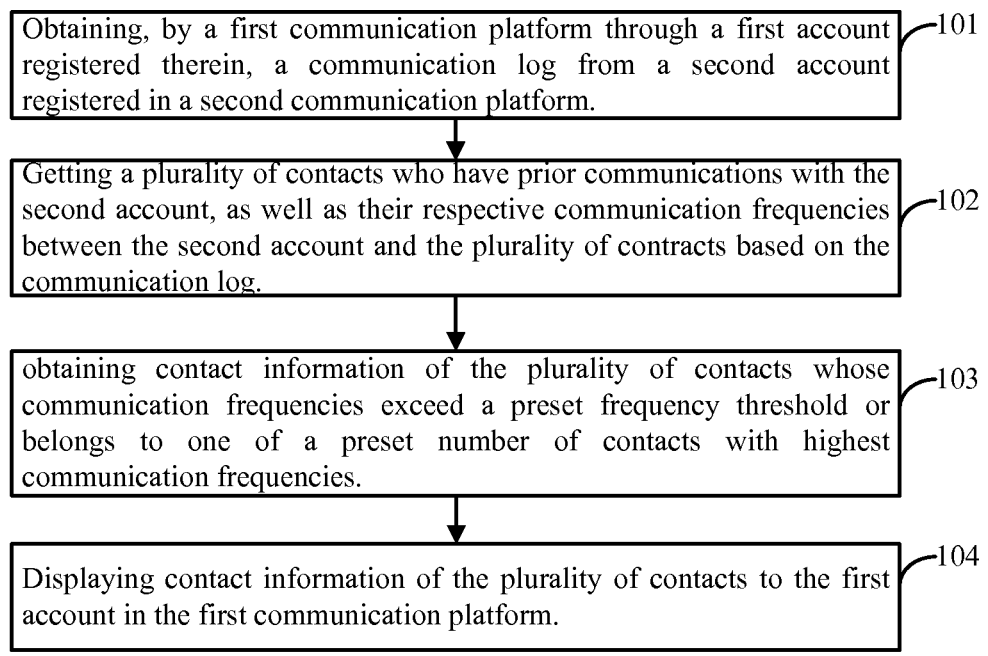
FIG. 1 is a flow diagram of a process to expand contacts provided in an example embodiment of the present disclosure.

FIG. 1 is a flow diagram of a method to expand contacts provided in an example embodiment of the present disclosure. The method may include the following steps:

Step 101: obtaining, by a first user account (i.e., a first account of a user) in a first platform through the processor of the first platform, communication logs of a second user account in a second platform. For example, an instant messenger, WeChat, of the user may be able to access the user's Gmail account and/or Google Hangouts account and obtain time, contents, and object contacts that the user communicated with in the past through the Gmail and/or Google Hangouts account.

The communication log may include communication information and communication time that the user (i.e., the first user or the second user) historically communicated with his/her contacts through the second user account and through the second communication platform. The first platform and the second platform may be service platform with communication functions on basis of IM (i.e., Instant Messenger, such as Google Hangouts and WeChat), SNS (i.e., Social Networking Services, such as Twitter and Facebook) or E-mail (e.g., Gmail), etc. Both the first user account and the second user account may belong to the same user, i.e., the user may register the first user account in the first platform and register the second user account in the second platform. In each platform, a user account number corresponding to the user account may be used to identify the user account. For example, a first user account number may be used to identify the first user account in the first platform, and a second user account number, corresponding to the second user account, may be used to identify the second user account in the second platform. With the authority from the user (e.g., by providing the second user account number and/or password to the first platform, the user allows the first platform to access the second user account) the first user account may access and retrieve data about the second user account. Thus the first user account and the second user account may be associated accounts.

Step 102: obtaining the contacts who have communicated with the second user account, as well as the communication frequencies between the second user account and the contracts according to the communication log;

Step 103: obtaining contact information of the contacts whose communication frequencies exceed a preset frequency threshold, or the contact information of a preset number of contacts with highest communication frequencies; and Step 104: displaying the contact information of the obtained contacts to the first user account in the first platform.

Accordingly, in the embodiment of the present disclosure, a first user account in a first platform may obtain the associated communication log of a second user account in a second communication platform; may obtain the contacts who have communicated with the second user account, as well as the communication frequencies between the second user account and the contracts according to the communication log; may obtain contact information of the contacts whose communication frequencies exceed preset frequency threshold, or the contact information of a preset number of contacts with highest communication frequencies. Then the first user account may display the contact information of the obtained contacts to the first user account in the first platform. The first user account may add the contact under addition according to the obtained contact information, who has the highest communication frequency with second user account associated with the first user account in the second communication platform, and thereby increase the communication frequency between the first user account and the obtained contacts, expanding the contacts of the first user account more easily and quickly.

Figure 2A:
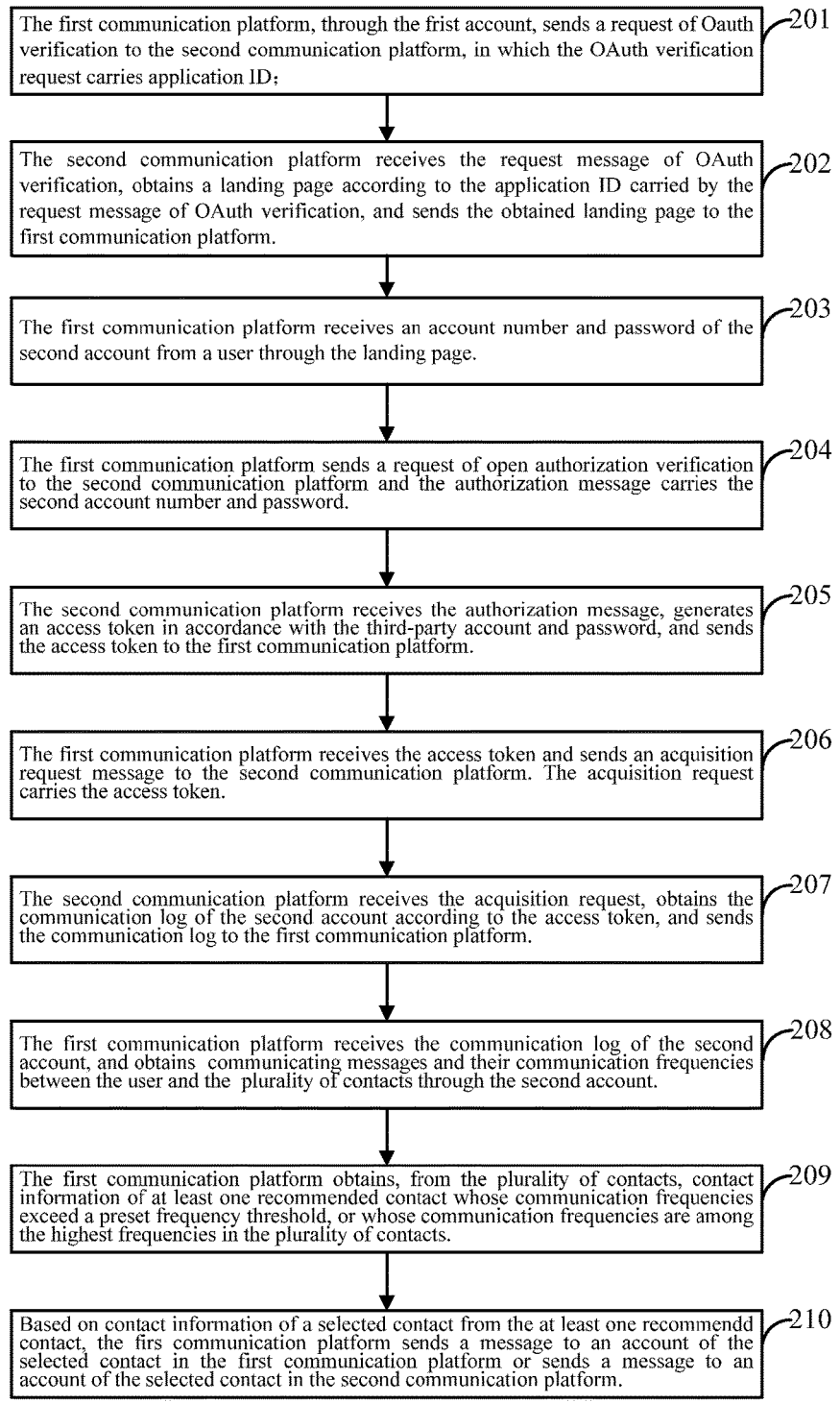
FIG. 2A is a flow diagram of a process to expand contacts provided in another example embodiment of the present disclosure.

FIG. 2A is a flow diagram of a method to expand contacts provided in another example embodiment of the present disclosure. The method may include the following steps.

Step 201: the first user account in the first platform may send a request message of OAuth Can open standard for authorization) verification to the second platform, in which the OAuth verification request carries an application ID.

The first platform and the second platform may be service platform with communication functions on basis of IM (Instant Messenger), SNS (Social Networking Services) or E-mail, etc.

The first user account in the first platform has stored an application ID beforehand, in which the application ID may be generated by the second communication platform when a developer (e.g., a service provider) of the second platform registers the first user account in the second communication platform beforehand, and the developer has stored the application ID generated by the second communication platform in the first user account. Here, the developer may be a service provider of a platform. For example, WeChat is an application that provides a social communication platform to its users. WeChat belongs to and is operated by TENCENT™. The developer of WeChat accordingly is TENCENT™. As another example, GMAIL™ is en email system developed and operated by GOOGLE™. accordingly, GOOGLE™ is the developer of GMAIL™.

In addition to the application ID, the second communication platform may also generate a landing page associated with the application ID, and stored the association between the generated application ID and the landing page. For example, the second communication platform may store the association in a table or a list.

Step 202: the second communication platform may receive the request message of OAuth verification, obtain the landing page according to the application ID carried by the request message of OAuth verification, and send the landing page to the first user account.

Step 203: the first platform may receive the landing page and input the second user account number and password through the landing page.

The first user account may receive the landing page from the first platform and display the landing page to the user. The landing page may contain an account number input box and password input box. Before receiving the landing page, the user has registered the second user account in the second communication platform, wherein the second user account may contain a second user account number and password. Accordingly, the user may input the second user account number and password of the second account in the account number input box and password input box, respectively, to access the second user account.

Further, the second user account may contain an address list and the communication log. The address list may contain the contact information of the contacts with whom the user communicated through the second user account. The contact information of each contact may contain the account number of the contact in the second platform and/or E-mail address of the contact. The communication log may contain communication messages and communication time between the user and the corresponding contact via the second user account.

Here, the second platform may provide E-mail and/or instant communication tool to for the user. Accordingly, the second user account may be such E-mail account or instant communication tool account, or both. Using his/her second user account on the second platform, the user may send emails to E-mail accounts of his/her contacts or receive emails from the E-mail accounts of the contacts. The E-mail accounts of the contact may be E-mail accounts on the second platform, or may be E-mail accounts from other communication platform. For example, one may use her Gmail account to receive emails from another Gmail account or a Yahoo! E-mail account. If the user uses the instant communication tool, the user may send an instant communication message to the accounts of his/her contacts or receive an instant communication message from an account of his/her contacts. The instant message the user received may be a message from an E-mail account, or may be a message from a contact using the same instant communication tool from the second platform. For example, if the user uses Google Hangouts, he/she may send and receive an E-mail to any E-mail account through Google Hangouts. He/she may also send and receive instant message from a contact, who is also using Google Hangouts. Correspondingly, communication message and communication time contained in the communication log may be the E-mail messages and/or instant message as well as the time that the user sent to and/or received from his/her contacts using the second user account.

Step 204: the first user account may send a request message of open authorization verification to the second communication platform wherein the authorization message carries the second user account number and password of the second user account.

Step 205: The second communication platform may receive the authorization message, generate an access token in accordance with the second user account and password of the second user account carried by the authorization message, and send the access token to the first user account.

The second platform may receive the request message of open authorization verification and according to the second user account number carried in the request message, may obtain the corresponding password of second user account. Then, the platform may compare the obtained password and the password carried by the request message. If the two password matches with each other, the platform may generate an access token in accordance with the second user account number and send the access token to the first user account, in which the access token may be used to identify the second user account.

If the obtained password does not match the one carried by the request message, the request message of open authorization verification may be denied. The user waiting on the first user account may be noticed that the input second user account number and/or password are incorrect.

Further, the second communication platform may store the second user account number and the generated access token in the correspondence between the second user account number and the generated access token.

Step 206: the first user account may receive the access token and send an acquisition request to the second platform. The acquisition request may carry the access token.

Further, the first user account may send a binding request to the first platform, wherein the binding request carries the second user account number and the first user account number; the first platform may receive and accept the binding request and bind the second user account number and the first user account number carried by the binding request.

To this end, the first platform may receive the binding request message, and store the second user account number and the first user account number as well as the association between the second user account number and the first user account number.

To this end, the first platform may search whether the first user account carried by the binding request has been bound to another account of the user in the second platform as well as whether the second user account carried by the binding request has been bound to another account of the user in the first platform. If a search result is true, the first platform may confirm with the user if the pre-existing association saved in the first platform should be substituted by the new association as requested by the binding request. The user may elect either binding the first and second user accounts and remove the pre-exiting association, or stop binding the first and second user account and keep the pre-existing association, or the user may elect to form a multiple binding relationships, i.e., binding the first and second user accounts while keeping the pre-existing association. For example, based on the second user account number carried by the binding request, the first platform may search associations stored therein to see if the second user account number carried by the binding request has been associated to and an account number from the first platform. If the first platform finds that the second user account number carried by the binding request message has already associated with an account number (i.e., a third account number) from the first platform other than the first user account number carried by the binding request, the platform may reconfirm with the user if he/she wishes to continuing the binding procedure as requested by the binding request. If the user confirms to bind the first and second user account numbers, the platform may delete the pre-existing association between the second user account and the third account and associate the second user account number carried by the binding request with the first user account number carried by the binding request. If the first platform does not find the third account number, it may search the stored associations to see if the first user account number carried by the binding request has been associated to another account number. If the first platform finds that the first user account number carried by the binding request has already associated with an account number (i.e., a fourth account number) from the second platform other than the second user account number, the first platform may reconfirm with the user if he/she wishes to continue the binding procedure. After receiving a confirmation from the user, the first platform may delete the pre-existing association between the first user account number carried by the binding request and the fourth account number and associate the first user account number carried by the binding request to the second user account number carried by the binding request.

Step 207: the second platform may receive the acquisition request, obtain the communication log of the second user account according to the access token carried by the acquisition request, and send the communication log of the second user account to the first user account.

The second platform may receive the acquisition request, access data of the second user account according to the access token carried by the acquisition request, and obtain the communication log of the second user account based on to the second user account number, and sends the communication log to the first user account. Further, the second platform may obtain the address list of the second user account and send the address list of the second user account to the first user account. Correspondingly, the first user account may receive the address list of the second user account sent by the second platform.

To access the second user account number according to the access token carried by the acquisition request, the second platform may obtain the second user account number from the stored association of the second user account number and access token according to the access token carried by the acquisition request. Alternatively, the second platform may obtain the access token carried by the acquisition request and conduct a reverse calculation to obtain the second user account number.

Step 208: the first user account may receive the communication log of the second user account, and obtain the contacts saved in the second user account who have communicated with the second user account and the communication frequency between the second user account and each contact.

In this step, the first platform may receive the communication log of the second user account from the second platform. By analyzing the communication log, the first platform may obtain the contacts of the user saved in the second user account, to whom the user has communicated with via the second user account. For each obtained contact, the first platform may calculate an amount of the communication messages between the second user account and the contact and may obtain the communication time of each communication message between the second user account and the contact; and then may calculate the communication frequency between the second user account and the contact according to the amount of the communication messages between the second user account and the contact, and the communication time of each communication message between the second user account and the contact.

Further, the first platform may also calculate the sum of communication messages contained in the communication log.

Figure 2B:
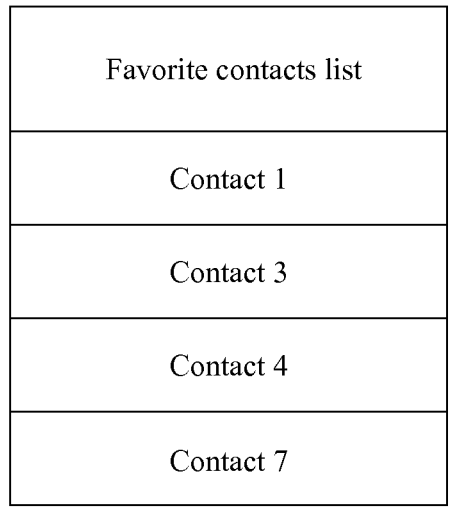
FIG. 2B is a schematic diagram of a favorite contract list provided in the example embodiment of the present disclosure.
Figure 2C:
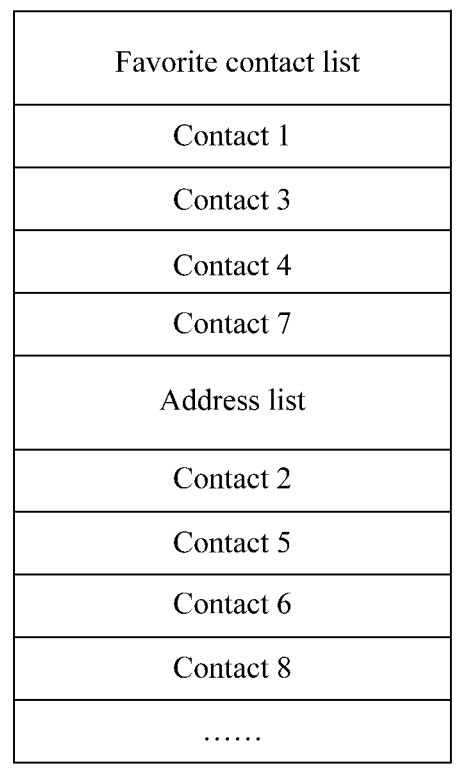
FIG. 2C is a schematic diagram of an comprehensive list provided in the example embodiment of the present disclosure.
Figure 2D:
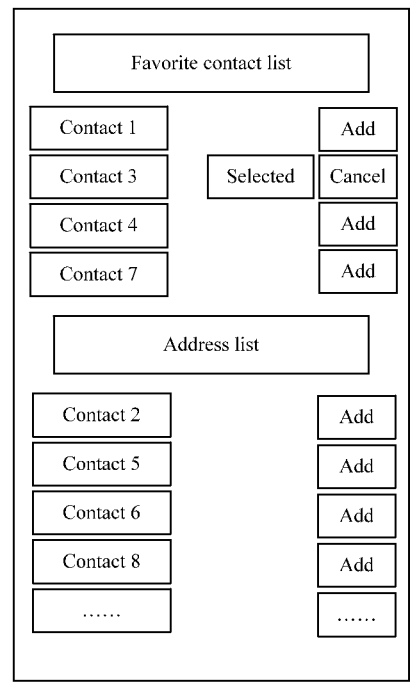
FIG. 2D is a schematic diagram of an addition interface provided in the example embodiment of the present disclosure.
Figure 2E:
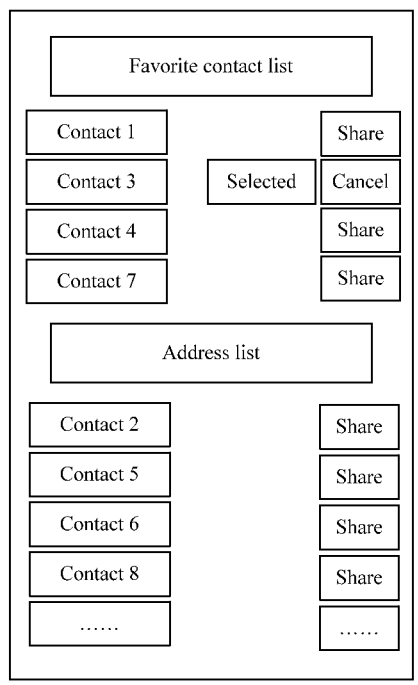
FIG. 2E is a schematic diagram of a sharing interface provided in the example embodiment of the present disclosure.
Figure 2F:
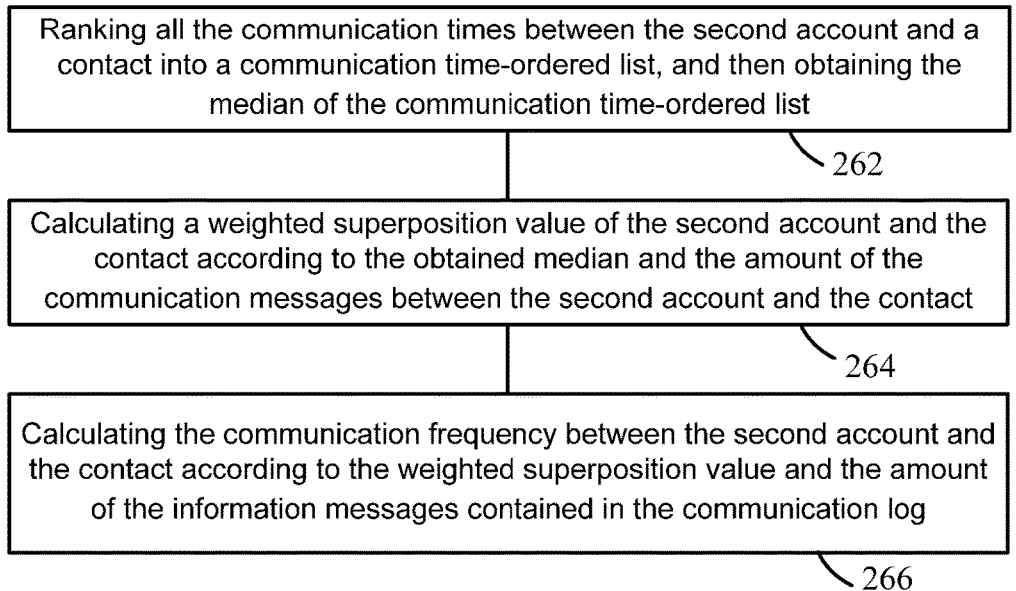
FIG. 2F is a flow diagram of a process to calculate a communication frequency between a contact and a user through an account of the user.

To calculate the communication frequency between the second user account and a particular contact and the communication time of each communication message between the second user account and the contact, the method may include the following steps, as shown in FIG. 2F.

Step 262: The first platform may determine the communication time of each communication message between the second user account and the contact, and then according to the length of the time of each communication, rank all the communication times into a communication time-ordered list, and then obtain the median of the communication time-ordered list.

To this end, if amount of the communication times contained in the communication time-ordered list is an odd number, the communication time located in the middle of the communication time-ordered list may be selected as the median. If the amount of the communication times is an even number, a quotient may be calculated by dividing the amount of the communication times contained in the communication time-ordered list by 2. The obtained quotient may be selected as the position in the communication time-ordered list, where the communication time will serve as the median.

Step 264: According to the obtained median and the amount of the communication messages between the second user account and the account, the first platform may calculate a weighted superposition value of the second user account and the contact with the formula below.

$$W = \frac{N-1}{(T - T_0 + 2)^G}; \quad (1)$$

where, W is the weighted superposition value of the second user account and the contact, N is the amount of the communication messages, T is the median in the communication time-ordered list, $T_0$ is the current time, G is the preset down-weight parameter, value of the preset down-weight parameter may be 1.8 or 2, etc., which is not limited specifically by the present disclosure.

Step 266: According to the weighted superposition value of the second user account and the contact, and the amount of the information messages contained in the communication log, the first platform may calculate the communication frequency between the second user account and the contact under the following formula:

$$f = \frac{W}{TX}; \quad (2)$$

where, f is the communication frequency between the second user account and the contact; W is the weighted superposition value of the second user account and the contact, and TX is amount of the communication messages of the second user account.

In the step above, the communication message and communication time between the second user account and the contact may be the E-mail and send-receive time respectively in the mail communication between the second user account and the contact, and/or, the chatting record and chatting time through an instant messaging application that the second user account is associated with between the second user account and the contact.

Correspondingly, in Step 208, to calculate the amount of communication messages in the communication log, the first platform may calculate the amount of emails and chatting records in the communication log. The first platform may also calculate the amount of communication messages between the second user account and the contact from the communication log, obtain the communication time of each communication message between the second user account and the contact, and calculate the communication frequency between the second user account and the contact in accordance with the amount of communication messages between the second user account and the contact, and the communication time of each communication message between the second user account and the contact, which may comprise below steps (A)-(F).

(A): the first platform may calculate the amount of emails between the second user account and the contact from the communication log, and may obtain the send-receive time of each E-mail between the second user account and the contact, as well as calculates the amount of chatting records between the second user account and the contact, and the chatting time of each chatting record between the second user account and the contact.

(B): the first platform may rank the send-receive time of each E-mail between the second user account and the contact to obtain a send-receive time-ordered list, as well as may obtain a first median of the send-receive time-ordered list.

The step to obtain the first medium of the send-receive time-ordered list may be as follows: If the amount of the send-receive times contained in the send-receive time-ordered list is an odd number, the send-receive time located in the middle of the send-receive time-ordered list may be selected as the first median. Otherwise, if the amount of the send-receive times contained in the send-receive time-ordered list is an even number, a quotient may be calculated through dividing the amount of the send-receive times contained in the send-receive time-ordered list by 2. The obtained quotient may be selected as the position in the send-receive time-ordered list, where the send-receive time will serve as the first medium.

(C): according to the obtained first median and the amount of the emails between the second user account and the account, the first platform may calculate the first weighted superposition value of the second user account and the contact with the formula below:

$$W_1 = \frac{N_1 - 1}{(T_1 - T_0 + 2)^G} \quad (3)$$

where, $W_1$ is the first weighted superposition value of the second user account and the contact, $N_1$ is the amount of the emails, $T_1$ is the first medium in the send-receive time-ordered list, $T_0$ is be the current time, G is the preset down-weight parameter, value of the preset down-weight parameter may be 1.8 or 2, etc., which is not limited specifically by the present disclosure.

(D): the first platform may rank the chatting time of each chatting record between the second user account and the contact to obtain a chatting time-ordered list, as well as may obtain the second median of the chatting time-ordered list.

The step to get the second medium of the chatting time-ordered list may be as follows. If the amount of the chatting times contained in the chatting time-ordered list is an odd number, the chatting time located in the middle of the chatting time-ordered list may be selected as the second median. Otherwise, if the amount of the chatting times contained in the chatting time-ordered list is an even number, a quotient may be calculated by dividing the amount of the chatting times contained in the chatting time-ordered list by 2. The obtained quotient may be selected as the position in the chatting time-ordered list, where the chatting time will serve as the second median.

(E): according to the obtained second medium and the amount of the emails between the second user account and the account, the first platform may calculate the second weighted superposition value of the second user account and the contact with the formula below:

$$W_2 = \frac{N_2 - 1}{(T_2 - T_0 + 2)^G}; \quad (4)$$

where, $W_2$ is the first weighted superposition value of the second user account and the contact, $N_2$ is the amount of the chatting records, $T_2$ is the second median in the chatting time-ordered list, $T_0$ is the current time, G is the preset down-weight parameter, value of the preset down-weight parameter may be 1.8 or 2, etc., which is not limited specifically by the present disclosure.

(F) according to the first weighted superposition value and the second weighted superposition value of the second user account and the contact, the amount of emails and chatting records contained in the communication log, the first platform may calculate the communication frequency between the second user account and the contact with the formula (5) as below.

$$f = \frac{W_1}{TR} + \frac{W_2}{TS}; \quad (5)$$

where, f is the communication frequency between the second user account and the contact; $W_1$ is the first weighted superposition value of the second user account and the contact; $W_2$ is the second weighted superposition value of the second user account and the contact, TR is the amount of the emails of the second user account, and TS is the amount of the chatting records of the second user account.

Step 209: the first platform may obtain contact information of the contacts whose communication frequencies exceed a preset frequency threshold, or the contact information of a preset number of contacts with highest communication frequencies.

In this step, the first platform may remove contacts who have communicated with the second user account but are not in the address list of the second user account (or alternatively, removing the names in the address list who does not appear in the contacts); select the information of contacts whose respective communication frequencies exceed the preset threshold from information of the remaining contacts, in which the information of contacts may include account numbers, names, telephone numbers, and/or E-mail addresses of the contacts, etc.; generate a favorite contacts list from the address list, transfers the information of selected contacts to the favorite contacts list, and lists the selected contacts in the favorite contacts list in descending order of communication frequency.

In the step above, the first platform may set a local timer and with the timer, triggers periodically the operation to update the favorite contacts list; or triggers periodically the operation to update favorite contacts list in other manners, such as event trigger, etc., which is not limited by the present disclosure.

Further, the first platform may combine the favorite contacts list and address list to form a comprehensive list.

For example, the first platform may create a favorite contacts list in the address list and select from the second user account information of four contacts with max communication frequencies, e.g., the information of Contact 1, information of Contact 3, information of Contact 4, and information of Contact 7, respectively, as shown in FIG. 2B. Besides, the first platform may transfer the contact information of Contacts 1, 3, 4 and 7 into the favorite contacts list and rank them in the contacts list in descending order of communication frequency. After that, the favorite contacts list and the address list may be combined to obtain the comprehensive list as shown FIG. 2C. The first platform may limit the above operation applicable only to newly added contact and maintain pre-existing contacts in the same way as they were previously listed.

Step 210: for each obtained contact, the first platform may send a message to an account (i.e., a first contact account) that the contact has in the first platform, and/or an account (i.e., a second contact account) that the contact has in the second platform, according to the contact information of the obtained contact.

In this step, the first platform may try to establish connections between the first user account with an account that one contact has in the first platform and/or the second platform. When the second user account selects a contact in the contacts list and requests the first user account to add the account that the selected contact has in the first platform, the first user account may receive the request from the second user account as well as the contact information of the selected contact, extract the account number corresponding to the account that the selected contact has in the second platform based on the contact information of the selected contact, and then send the account number of the selected contact in the second platform to the first platform; then, the first platform may receive the selected contact's account number in the second platform, obtain his/her account number in the first platform that is bound to his/her account number in the second platform, and send the obtained account number (target account number) of the selected contact in the first platform to the first user account. The first user account may receive the target account number and send an addition request (i.e., a message for adding the target account in a contact list of the first user account) to the target account corresponding to the target account number of the selected contact, in which the addition request may be the one used to request to add the obtained contact into the friends list.

For example, Tom has a Gmail account at www.google.com, and uses his Gmail to log in his Google Hangouts to chat with friends. When Tom decides to use WeChat (an instant messenger) to communicate with his friends, he opens a WeChat account at www.wechat.com, the host platform of WeChat, and installs a WeChat application in his computer. Tom subsequently authorizes WeChat, i.e., www.wechat.com, to obtain contacts from his Gmail account. Accordingly, www.wechat.com may access Tom's Gmail account and obtain a comprehensive list of contacts therefrom, according to Steps 201-209. From the comprehensive list, Tom may, through the WeChat application, select his Google Hangout contact Beth and wish to send a friend request to Beth. Alternatively, Tom's Google Hangout may select Beth and ask WeChat to add Beth as Tom's friend in WeChat. WeChat may extract Beth's Google Hangout account number based on her account information from the comprehensive list, and send the account number to the supporting platform www.wechat.com. Based on Beth's account number, www.wechat.com may find the target account number, i.e., Beth's WeChat account that is bind with her Google Hangout account, and send Beth's WeChat account number to Tom's WeChat account, so that Tom may be able to send a friend request to Beth's WeChat account.

In the step above, the second user account may submit the first command of contact addition to the first user account. The first user account receives the first command, displays the comprehensive list on the addition interface as shown in FIG. 2D. An addition button may be set corresponding to each contact in the addition interface, and the user can select the contact by clicking the button corresponding to the contact under addition.

Here, because the selected contact has an account in both in the first platform and the second platform, he/she may have bind the two accounts to each other prior to the user. Thus the first platform may have stored an association binding his/her account in the first platform to his/her account in the second platform in a database. Accordingly, to obtain the selected contact's account number in the first platform that is bound to his/her account number in the second platform, the first platform may search, from the database of the first platform, the above association. If such association is confirmed, i.e., the first platform does find the association, it may confirm that the account in the first platform in the association is the one that is the one bound with the selected contact's account number in the second platform.

In the step above, the contact may login its own first user account, receive the addition request message in the first user account, and response the addition request message, e.g. accept or decline the addition request.

Further, if the first platform does not obtain the selected contact's account number in the first platform bound to his/her account number in the second platform, the first platform may send a notification message to the first user account to inform the user.

The first user account may receive the notification message, and send an E-mail to the selected contact's second contact account through a public E-mail, according to an E-mail address contained in the contact information of the selected contact. The E-mail may contain a first prompt message, which requests the selected contact to bind his/her second contact account number to his/her first contact account number, and/or a second prompt message, which requests the selected contact to register an account in the first platform.

The E-mail may be sent consistently through a preset public E-mail in the second platform, which is detailed as follow: when the second user account has a shared message, and the second user account selects one contact in the favorite contacts list and sends the shared message to the first contact account or second contact account of the contact, the first user account may obtain the contact information of the contact selected by the second user account, extract the second contact account number of the selected contact, and send the selected contact's second contact account number to the first platform; based on the second contact account number of the selected contact, the first platform may obtain the first contact account number of the contact that is bound to the second contact account number, and send the obtained first contact account number of the selected contact to the first user account. Receiving the first contact account number, the first platform may send a shared message to the selected contact's first contact account.

For example, Tom's Google Hangout account may have a shared message. The Google Hangout account may select Beth from the contact list and may wish to send the shared message to Beth's WeChat account or Google Hangout account. To this end, Tom's WeChat account may first obtain Beth's contact information, and then extract account information of her Google Hangout account. The platform of WeChat then may obtain Beth's WeChat account that is previously bound to her Google Hangout account. Beth's WeChat account is then sent to Tom's WeChat account, which may subsequently send the shared message to Beth's WeChat account.

The second user account may submit to the first user account a second command of sharing the shared message. The first user account may receive the second command, display the comprehensive list on the addition interface as shown in FIG. 2E. The addition interface may include an share button corresponding to each contact in the addition interface, and the user may select to share a message to a contact in the list by clicking the share button corresponding to the contact.

Further, if the first platform does not obtain the first contact account number bound with the second contact account number of the selected contact, it may send an E-mail to the second contact account of the selected contact through a public E-mail, according to E-mail address contained in contact information of the contact. The E-mail may contain the shared message.

In the embodiment of the present disclosure, the first user account in the first platform may be a client, etc.

In the above example embodiments of the present disclosure, the first user account may obtain contact information of the contacts whose communication frequencies exceed preset frequency threshold, or the contact information of a preset number of contacts with the highest communication frequencies. The obtained contacts have the highest communication frequencies with the second user account and their contact information may be recommended to the first user account to expand the contacts or relationship chain of the first user account. If the obtained contact has no first contact account, the second user account may communicate with the obtained contact through a public E-mail, which can expand the relationship chain of the first user account. Besides, the first platform may obtain the address list in the second user account and remove the names in the contacts that does not also appear in the address list to ensure that all the remaining contacts may all be the friends of the second user account. Relatively high communication frequencies exist between the second user account and the friends of the second user account, so that interaction of the instant communication may be improved.

Figure 3:
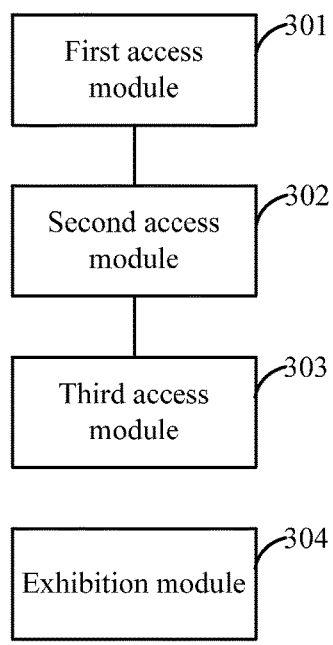
FIG. 3 is a structure schematic diagram of a device to expand contacts provided in another example embodiment of the present disclosure.

FIG. 3 is a structure schematic diagram of a device to expand contacts provided in another example embodiment of the present disclosure. The device may include:

A first access module 301 configured to obtain the communication log of the second user account in the second platform associated to the first user account in the first platform, wherein the communication log may include the communication information and communication time of the second user account to contacts through the second platform;

A second access module 302 configured to obtain the contacts who have communicated with the second user account, as well as the communication frequencies between the second user account and the contracts according to the communication log; and A third access module 303 configured to obtain the contact information of the contacts whose communication frequencies exceed a preset frequency threshold, or the contact information of a preset number of contacts with highest communication frequencies; and An exhibition module 304 configured to display the contact information of the obtained contacts to the first user account in the first platform.

The first platform and the second platform may be service platform with communication functions on basis of IM (Instant Messenger), SNS (Social Networking Services) or E-mail, etc.

The first access module 301 may include a first transmission unit and a first receiving unit. The first transmission unit may be configured to send the acquisition request, which may carry an access token. The access token may be configured to identify the second user account in the second platform and make the second platform to confirm the second user account and obtain the communication log from the second platform. The first receiving unit may be configured to receive the communication log sent from the second platform.

Further, the first access module 301 may also include a first access unit configured to obtain the access token, according to a second user account number and password corresponding to the second user account. The first access unit may include a first transmission subunit, a receiving subunit, and a second transmission subunit. The first transmission subunit may be configured to transmit a request message of open authorization verification to the second platform; the receiving subunit may be configured to receive the landing page transmitted by the second platform and receive the second user account number and password through the landing page; and the second transmission subunit may be configured to send an authorization message to the second platform, in which the authorization message contains the second user account number and password, making the second platform generate an access token on the basis of the second user account number and password.

The second access module 302 may include a second access unit, a third access unit, and a calculation unit. The second access unit may be configured to obtain the contacts who have communicated with the second user account according to the communication log; the third access unit may be configured to obtain the amount of communication messages between the second user account and the contact, and obtain communication time of each communication message between the second user account and the contact; and the calculation unit may be configured to calculate the communication frequency between the second user account and the contact, according to the amount of communication messages between the second user account and the contact, and to the communication time of each communication message between the second user account and the contact.

The third access module 303 may include a forth access unit, a removing unit, and a selection unit. The forth access unit may be configured to obtain the address list of the second user account stored in the second platform, in which the address list contains contact information of the contacts in the second user account; the removing unit may be configured to remove the contacts not existing in the address list of the second user account from those have communicated with the second user account; and the selection unit may be configured to select the contact information of the contacts whose communication frequencies exceed the preset frequency threshold, or the contact information of a preset number of contacts with highest communication frequencies, from the remaining contacts.

Further, the third access module 303 may be also composed of a transfer unit configured to create a favorite contacts list in the address list and transfer contact information of the select contacts from the address list to the favorite contacts list.

Further, the device may be also include a transmission module configured to transmit a message to the first contact account or to the second contact account of the selected contact, according to the obtained information of the selected contact.

The transmission module may include an extraction unit, a second transmission unit, and a second receiving unit. The extraction unit may be configured to extract the second contact account number corresponding to the second contact account of the selected contacts from the selected contact information; the second transmission unit may be configured to transmit the second contact account number of the selected contact to the first platform, making the first platform to obtain the first contact account number of the selected contact bound to the second contact account number; and the second receiving unit may be configured to receive the first contact account number of the selected contact from the first platform, and send a message to the first contact account corresponding to the first contact account number of the selected contact, in which the message may be a friend addition request message, used to request to add the selected contact in a friends list or a shared message which needs to be shared.

Further, the transmission module may also include a third transmission unit configured to transmit an E-mail to the second contact account of the selected contact through a public E-mail according to the E-mail address contained in contact information of the selected contact, on condition that it does not obtain the first contact account number of the selected contact bound to the second contact account number, wherein the E-mail may contain a first prompt message used to request the selected contact to bind his/her second contact account number and first contact account number, and/or a second prompt message used to request the selected contact register an account in the first platform.

Further, the transmission module may include a forth transmission unit configured to send an E-mail to the second contact account of the selected contact through the public E-mail, according to the E-mail address contained in contact information of the selected contact, on condition that the first platform does not find the first contact account number of the selected contact that is bound to the second contact account number, wherein the E-mail may contain the shared message.

Further, the communication message stored in communication log may contain E-mails in the E-mail communication between the second user account and its contacts, and/or the communication log of instant communication between the second user account and its contacts.

In the embodiment of the present disclosure, the first user account of the first platform may be a client, etc.

Thus, example embodiments illustrated in FIGS. 1-5 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A computer-implemented method for expanding online contacts of a user, comprising:
   providing a first account registered in a first communication server to the user, wherein the first communication server includes a processor;
   accessing, by the processor through the first account from the first communication server, a second account of the user registered in a second communication server;
   obtaining, by the processor and from the second communication server, a communication log associated with communication history of the user through the second account by:
      obtaining, by the processor, an access token of the second account from the second communication server, wherein the access token is configured to identify the second account in the second communication server, and instruct the second communication server to confirm the second account and obtain the communication log from the second account;
      sending, by the processor, an acquisition request carrying the access token to the second communication server; and
      receiving the communication log from the second communication server; and
   obtaining, by the processor, an address list from the second communication server, wherein the address list includes a plurality of personal connections of the user;
   obtaining, by the processor, a plurality of contacts from the second communication server who have a prior communication with the user through the second account based on the communication log;
   selecting, by the processor from the plurality of contacts, at least one recommended contact for the user;
   combining, by the processor, the at least one recommended contact with the address list into a combined list; and
   displaying, by the processor, the combined list via the first account, highlighting the at least one recommended contact to the user.

2. The method in accordance with claim 1, wherein the obtaining of the access token comprises:
   sending, by the processor, a request of open authorization verification to the second communication server;
   receiving, by the processor, a landing page from the second communication server, wherein the landing page is configured to receive an account number and password of the second account from the user;
   receiving, by the processor, the account number and a password of the second account from the user;
   sending, by the processor, an authorization message to the second communication server, wherein the authorization message includes the account number and password of the second account; and
   receiving, by the processor, the access token from the second communication server as a response of the sending of the account number and password of the second account.

3. The method in accordance with claim 1, further comprising, for each of the at least one recommended contact:
   sending, by the processor, a first message to a first contact account of the each of the at least one recommended contact in the first communication server when the processor determines that a second contact account of the each of the at least one recommended contact in the second communication server has been bound to the first contact account; and
   sending, by the processor, a second message to an E-mail address associated with the second contact account when the processor determines that the second contact account of the each of the at least one recommended contact has not been bound to the first contact account of the each of the at least one recommended contact.

4. The method in accordance with claim 3, wherein,
   the first message is a request to add the each of the at least one recommended contact in a friend list associated with the first account or a request to share a message; and
   the second message is an E-mail message sent through a public E-mail account associated with the second communication server, wherein the E-mail message includes at least one of:
      a request to the each of the at least one recommended contact to bind the second contact account to the first contact account,
      a request to the each of the at least one recommended contact to register an account in the first communication server, and
      a shared message.

5. A computer-implemented method for expanding online contacts of a user, comprising:
   providing a first account registered in a first communication server to the user, wherein the first communication server includes a processor;
   accessing, by the processor through the first account from the first communication server, a second account of the user registered in a second communication server;
   obtaining, by the processor and from the second communication server, a communication log associated with communication history of the user through the second account;
   obtaining, by the processor, an address list from the second communication server, wherein the address list includes a plurality of personal connections of the user;

obtaining, by the processor, a plurality of contacts from the second communication server who have a prior communication with the user through the second account based on the communication log;

selecting, by the processor from the plurality of contacts, at least one recommended contact for the user by:
  removing, from the plurality of contacts, contacts that are not one of the plurality of personal connections in the address list;
  selecting from the remaining plurality of contacts at least one contact that has previously communicated with the user through the second account at a communication frequency that:
    exceeds a preset frequency threshold, or
    belongs to a first preset number of contacts with highest communication frequencies with the user; and
  assigning, by the processor, the selected at least one contact as the at least one recommended contact;

combining, by the processor, the at least one recommended contact with the address list into a combined list; and displaying, by the processor, the combined list via the first account, highlighting the at least one recommended contact to the user.

6. The method in accordance with claim 5, wherein the communication log includes communication messages and communication times between the user and each of the plurality of contacts through the second account.

7. The method in accordance with claim 6, wherein for each of the plurality of contacts the communication frequency is determined by:
  obtaining, by the processor and based on the communication log, an amount of communication messages between the contact and the user through the second account, and obtaining, by the processor and based on the communication log, a communication time corresponding to each of the communication messages; and
  determining, by the processor, the communication frequency based on the amount of communication messages and the corresponding communication times.

8. The method in accordance with claim 6, wherein the communication messages include at least one of:
  logs of E-mail communications between the user and the plurality of contacts through the second account, and
  logs of instant message communications between the user and the plurality of contacts through the second account.

9. A communication account server, comprising:
  a processor-readable non-transitory storage medium including a set of instructions for expanding online contacts of a user; and
  a processor in communication with the non-transitory storage medium, configured to execute the set of instructions to:
    provide a first communication platform;
    provide a first account registered in the first communication platform to the user;
    access, through the first account communication platform, a second account of the user registered in a second communication platform;
    obtain an access token of the second account from the second communication platform, wherein the access token is configured to identify the second account in the second communication platform, and instruct the second communication platform to confirm the second account and obtain a communication log associated with communication history of the user through the second account;
    send an acquisition request carrying the access token to the second communication platform;
    receive the communication log from the second communication platform;
    obtain an address list from the second communication platform, wherein the address list includes a plurality of personal connections of the user;
    obtain a plurality of contacts from the second communication platform who have a prior communication with the user through the second account based on the communication log;
    select, from the plurality of contacts, at least one recommended contact for the user;
    combine the at least one recommended contact with the address list into a combined list; and
    display the combined list via the first account, highlighting the at least one recommended contact to the user.

10. The communication account server in accordance with claim 9, wherein to obtain the access token the processor is further configured to execute the set of instructions to:
  send a request of open authorization verification to the second communication platform; receive a landing page from the second communication platform, wherein the landing page is configured to receive an account number and a password of the second account from the user; and
  receive the account number and password of the second account from the user;
  send an authorization message to the second communication platform, wherein the authorization message includes the account number and password of the second account;
  receive the access token from the second communication platform as a response of the sending of the account number and password of the second account.

11. The communication account server in accordance with claim 9, wherein to select the at least one recommended contacts the processor is further configured to execute the set of instructions to:
  remove, from the plurality of contacts, contacts that are not one of the plurality of personal connections in the address list;
  select, from the remaining plurality of contacts, at least one contact that has previously communicated with the user through the second account at a communication frequency that:
    exceeds a preset frequency threshold, or
    belongs to a first preset number of contacts with highest communication frequencies with the user; and
  assign the selected at least one contact as the at least one recommended contact.

12. The communication account server in accordance with claim 11, wherein the communication log includes communication messages and communication times between the user and each of the plurality of contacts through the second account.

13. The communication account server in accordance with claim 12, wherein for each of the plurality of contacts the communication frequency is determined by:
  Obtain, based on the communication log, an amount of communication messages between the contact and the user through the second account, and Obtain, based on the communication log, a communication time corresponding to each of the communication messages; and determine the communication frequency based on the amount of communication messages and the corresponding communication times.

14. A communication account server, comprising:
a processor-readable non-transitory storage medium including a set of instructions for expanding online contacts of a user; and
a processor in communication with the non-transitory storage medium, configured to execute the set of instructions to:
provide a first communication platform;
provide a first account registered in the first communication platform to the user;
access, through the first account communication platform, a second account of the user registered in a second communication platform;
obtain, from the second communication platform, a communication log associated with communication history of the user through the second account;
obtain an address list from the second communication platform, wherein the address list includes a plurality of personal connections of the user;
obtain a plurality of contacts from the second communication platform who have a prior communication with the user through the second account based on the communication log;
select, from the plurality of contacts, at least one recommended contact for the user;
combine the at least one recommended contact with the address list into a combined list;
display the combined list via the first account, highlighting the at least one recommended contact to the user; and
for each of the at least one recommended contact:
send a first message to a first contact account of the each of the at least one recommended contact in the first communication platform when the processor determines that a second contact account of the each of the at least one recommended contact in the second communication platform has been bound to the first contact account; and
send a second message to an E-mail address associated with the second contact account when the processor determines that the second contact account of the recommended contact has not been bound to the first contact account of the each of the at least one recommended contact.

15. The communication account server in accordance with claim 14, wherein,
the first message is a request to add the each of the at least one recommended contact in a friend list associated with the first account or a request to share a message; and
the second message is an E-mail message sent through a public E-mail account associated with the second communication platform, wherein the E-mail message includes at least one of:
a request to the each of the at least one recommended contact to bind the second contact account to the first contact account,
a request to the each of the at least one recommended contact to register an account in the first communication platform, and
a shared message.

16. The communication account server in accordance with claim 12, wherein the communication messages include at least one of:
logs of E-mail communications between the user and the plurality of contacts through the second account, and
logs of instant message communications between the user and the plurality of contacts through the second account.

* * * * *